United States Patent
Dada

(10) Patent No.: US 9,969,328 B1
(45) Date of Patent: May 15, 2018

(54) CHILD SEAT OCCUPANCY WARNING DEVICE

(71) Applicant: Mobolaji Dada, Chicago, IL (US)

(72) Inventor: Mobolaji Dada, Chicago, IL (US)

( * ) Notice: Subject to any disclaimer, the term of this patent is extended or adjusted under 35 U.S.C. 154(b) by 0 days. days.

(21) Appl. No.: 15/413,652

(22) Filed: Jan. 24, 2017

(51) Int. Cl.
*B60Q 9/00* (2006.01)
*B60R 22/00* (2006.01)
*B60N 2/00* (2006.01)
*B60N 2/28* (2006.01)

(52) U.S. Cl.
CPC .............. *B60Q 9/00* (2013.01); *B60N 2/002* (2013.01); *B60R 22/00* (2013.01); *B60N 2/28* (2013.01)

(58) Field of Classification Search
CPC . B60Q 9/00; B60Q 9/001; B60N 2/00; B60N 2/002; B60R 2022/025; B60R 2022/026; B60R 22/08; B60R 22/10; B60R 22/024; B60R 22/105
USPC .............................................. 340/457, 457.1
See application file for complete search history.

(56) References Cited

U.S. PATENT DOCUMENTS

| 4,674,212 | A | 6/1987 | Snodgrass | |
|---|---|---|---|---|
| 7,230,530 | B1 | 6/2007 | Almquist | |
| 7,339,463 | B2 | 3/2008 | Donaldson | |
| 8,063,788 | B1 * | 11/2011 | Morningstar | B60N 2/002 180/271 |
| D650,715 | S | 12/2011 | Hill et al. | |
| 8,408,156 | B2 * | 4/2013 | Banda | B60R 22/00 116/28 R |
| 2005/0134214 | A1 * | 6/2005 | Geiger | B60R 11/02 320/111 |
| 2009/0243861 | A1 * | 10/2009 | Ortiz | G08B 3/10 340/573.1 |
| 2011/0285524 | A1 | 11/2011 | Qian et al. | |
| 2016/0336701 | A1 * | 11/2016 | Hopkins | H01R 24/20 |

* cited by examiner

*Primary Examiner* — Steven Lim
*Assistant Examiner* — Mancil Littlejohn, Jr.

(57) ABSTRACT

A child seat occupancy warning device for warning a driver of an occupied child seat includes an alarm. The alarm is configured to couple to a child safety seat that is positioned in a vehicle. The alarm is reversibly and operationally couplable to a driver's side seatbelt of the vehicle. The alarm is activated upon coupling to the driver's side seatbelt. The alarm is compelled to issue a warning upon decoupling of the alarm from the driver's side seatbelt. The alarm is positioned to couple to the driver's side seatbelt such that the driver's side seatbelt is fixed in an extended configuration. Decoupling of the alarm from the driver's side seatbelt is required for a driver to exit the vehicle. Decoupling of the alarm from the driver's side seatbelt compels the alarm to issue a warning to the driver that there is an occupied child safety seat in the vehicle.

13 Claims, 4 Drawing Sheets

CHILD SEAT OCCUPANCY WARNING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to warning devices and more particularly pertains to a new warning device for warning a driver of an occupied child seat.

BRIEF SUMMARY OF THE INVENTION

An embodiment of the disclosure meets the needs presented above by generally comprising an alarm. The alarm is configured to couple to a child safety seat that is positioned in a vehicle. The alarm is reversibly and operationally couplable to a driver's side seatbelt of the vehicle. The alarm is activated upon coupling to the driver's side seatbelt. The alarm is compelled to issue a warning upon decoupling of the alarm from the driver's side seatbelt. The alarm is positioned to couple to the driver's side seatbelt such that the driver's side seatbelt is fixed in an extended configuration. Decoupling of the alarm from the driver's side seatbelt is required for a driver to exit the vehicle. Decoupling of the alarm from the driver's side seatbelt compels the alarm to issue a warning to the driver that there is an occupied child safety seat in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
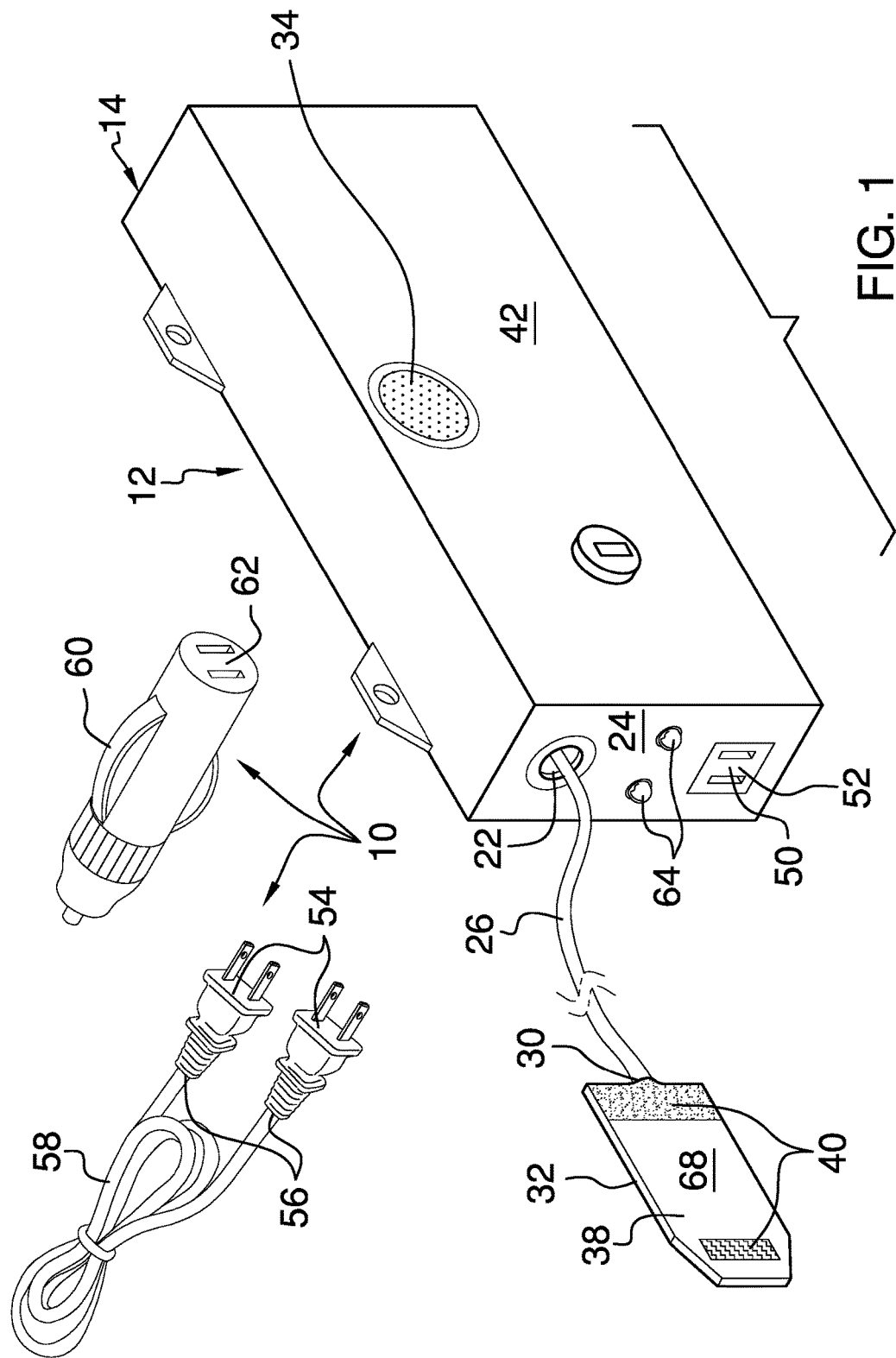
FIG. 1 is an isometric perspective view of a child seat occupancy warning device according to an embodiment of the disclosure.
Figure 2:
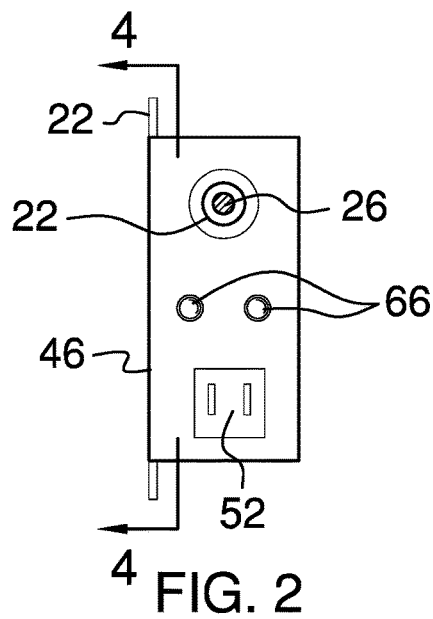
FIG. 2 is a front view of an embodiment of the disclosure.
Figure 3:
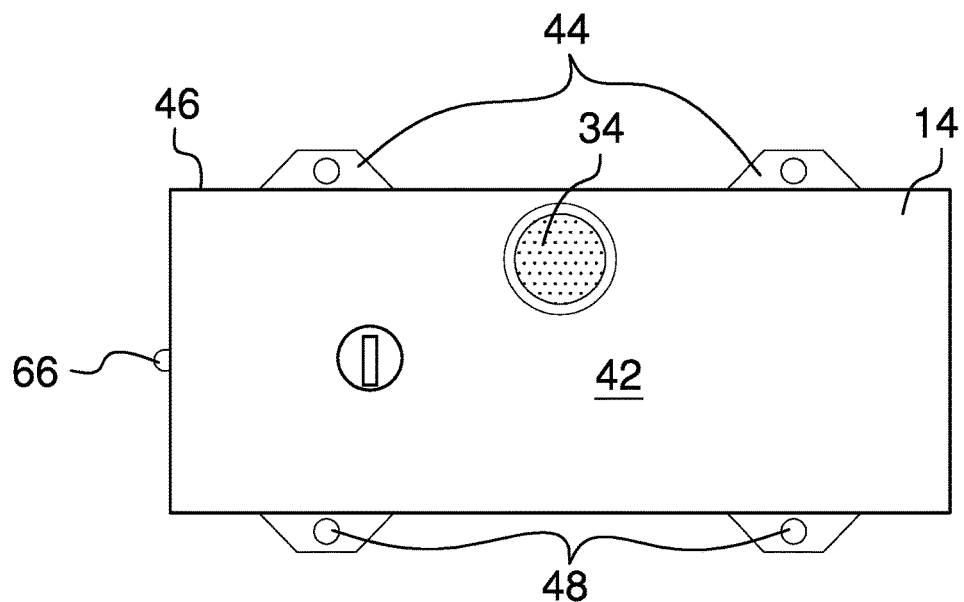
FIG. 3 is a side view of an embodiment of the disclosure.
Figure 4:
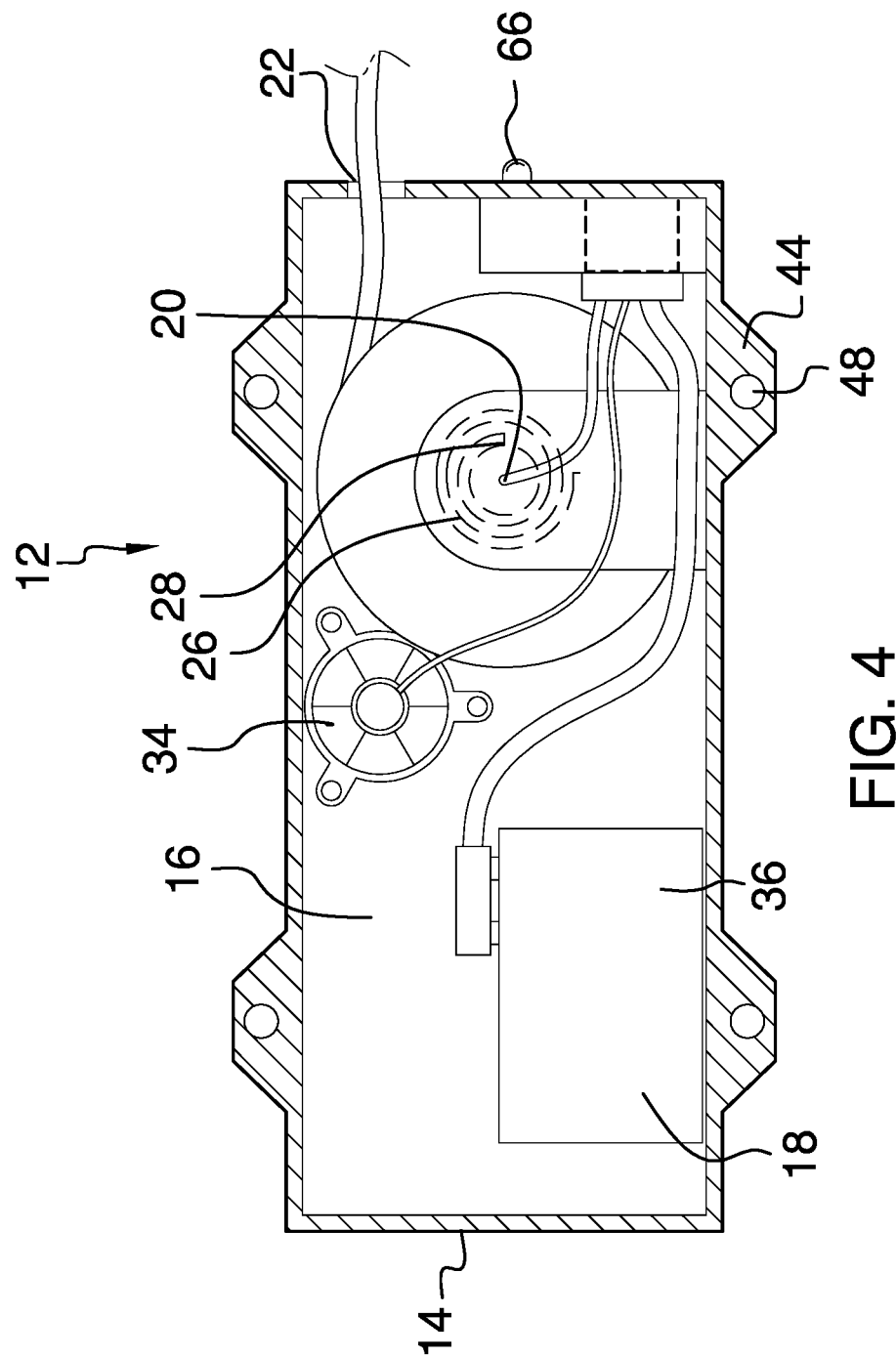
FIG. 4 is a cross-sectional view of an embodiment of the disclosure.
Figure 5:
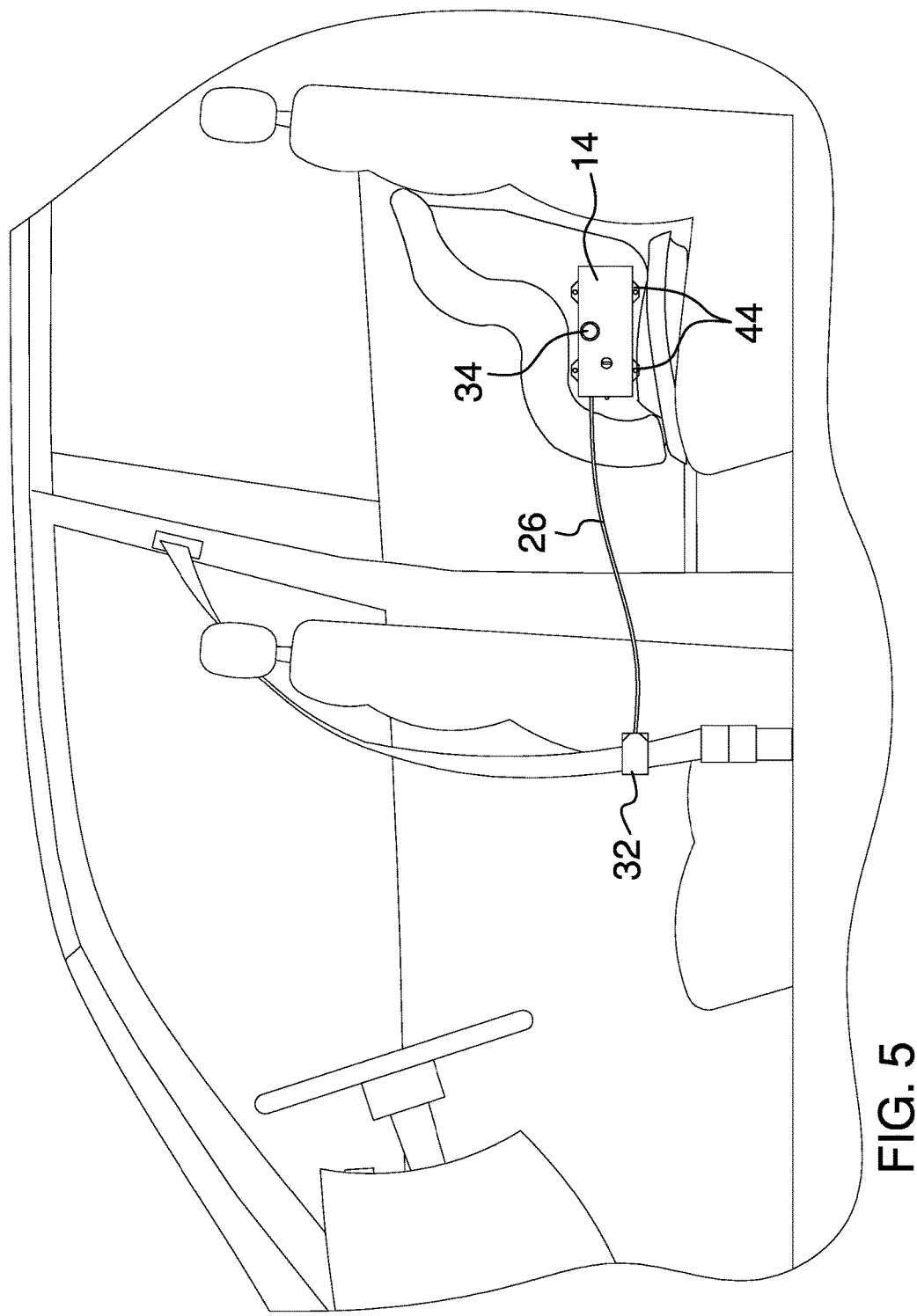
FIG. 5 is an in-use view of an embodiment of the disclosure.

With reference now to the drawings, and in particular to FIGS. 1 through 5 thereof, a new warning device embodying the principles and concepts of an embodiment of the disclosure and generally designated by the reference numeral 10 will be described.

As best illustrated in FIGS. 1 through 5, the child seat occupancy warning device 10 generally comprises an alarm 12. The alarm 12 is configured to couple to a child safety seat that is positioned in a vehicle. The alarm 12 is reversibly and operationally couplable to a driver's side seatbelt of the vehicle. The alarm 12 is activated upon coupling to the driver's side seatbelt and compelled to issue a warning upon decoupling from the driver's side seatbelt.

The alarm 12 comprises a housing 14 that defines an internal space 16. The housing 14 is configured to couple to the child safety seat. In one embodiment, the housing 14 is substantially rectangularly box shaped.

A power module 18 and a reel 20 are coupled to the housing 14 and are positioned in the internal space 16. The reel 20 is spring-loaded. A hole 22 is positioned in a front 24 of the housing 14 proximate to the reel 20. A cable 26 is coiledly positioned around the reel 20. A first end 28 of the cable 26 is coupled to the reel 20. The cable 26 is selectively extendable from the reel 20 through the hole 22. A second end 30 of the cable 26 is positioned external to the housing 14. A fastener 32 is coupled to the second end 30 of the cable 26. The fastener 32 is configured to reversibly couple to the driver's side seatbelt. A speaker 34 is coupled to the housing 14. The speaker 34 is operationally coupled to the reel 20. The speaker 34 is selectively couplable to the power module 18.

The cable 26 is configured to extend from the housing 14 to position the fastener 32 for coupling to the driver's side seatbelt, coincident with decoupling of the speaker 34 from the power module 18. The cable 26 is configured to retract into the housing 14 upon decoupling of the fastener 32 from the driver's side seatbelt, coincident with coupling of the speaker 34 to the power module 18. The speaker 34 is compelled to issue an audible warning to a driver that there is an occupied child safety seat in the vehicle.

In one embodiment, the power module 18 comprises at least one battery 36. In another embodiment, the at least one battery 36 is rechargeable. In yet another embodiment, the fastener 32 comprises a panel 38. The panel 38 is flexible such that the panel 38 is configured to bend around the driver's side seatbelt. A hook and loop fastener 40 is positioned on a face 68 of the panel 38. The hook and loop fastener 40 is configured to couple the panel 38 to the driver's side seatbelt. In still yet another embodiment, the speaker 34 is positioned on a side 42 of the housing 14.

Each of a plurality of tabs 44 is coupled to and extends from a top edge 46 of the housing 14. Each of a plurality of penetrations 48 is positioned through a respective tab 44. The penetrations 48 are configured to insert mounting hardware, such as screws, to couple the housing 14 to the child safety seat.

A first connector 50 is coupled to the housing 14. The first connector 50 is operationally coupled to the at least one battery 36. The first connector 50 is configured to couple the at least one battery 36 to a power source, such that the at least one battery 36 is configured to recharge. In one embodiment, the first connector 50 comprises a first socket 52.

Each of a pair of second connectors 54 is coupled to a respective opposing end 56 of a cord 58. The second connectors 54 are complementary to the first connector 50. A respective second connector 54 is positioned to couple to the first connector 50 to couple the cord 58 to the at least one battery 36. A plug 60 is configured to couple to a cigarette lighter receptacle of the vehicle. A third connector 62 is coupled to the plug 60. The third connector 62 is complementary to the second connectors 54. The third connector 62 is positioned to couple to a respective second connector 54 to couple the cord 58 to the plug 60.

Each of a pair of lights 64 is coupled to the housing 14. The lights 64 are operationally coupled to the at least one battery 36. The lights 64 are configured to display a charge level and a charging state of the at least one battery 36. In one embodiment, the lights 64 are positioned on the front 24 of the housing 14. In another embodiment, the lights 64 comprise light emitting diodes 66.

In use, the cable 26 is configured to extend from the housing 14 such that the hook and loop fastener 40 is configured to couple the panel 38 to the driver's side seatbelt, coincident with decoupling of the speaker 34 from the power module 18. The cable 26 is configured to retract into the housing 14 upon decoupling of the fastener 32 from the driver's side seatbelt, coincident with coupling of the speaker 34 to the power module 18. The speaker 34 is compelled to issue an audible warning to a driver that there is an occupied child safety seat in the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A child seat occupancy warning system comprising:
a vehicle having a driver seat;
an alarm configured for coupling to a child safety seat positioned in said vehicle, said alarm being operationally couplable to a driver's side seatbelt of the vehicle such that said alarm is armed upon coupling to the driver's side seatbelt and activated to issue a warning upon decoupling from the driver's side seatbelt, said alarm comprising
a housing defining an internal space, said housing being configured for coupling to the child safety seat,
a power module coupled to said housing and positioned in said internal space,
a reel coupled to said housing and positioned in said internal space, said reel being spring-loaded,
a hole positioned in a front of said housing proximate to said reel,
a cable having a first end coupled to said reel, said cable being coiledly positioned around said reel such that said cable is selectively extendable from said reel through said hole, wherein a second end of said cable is positioned external to said housing,
a fastener coupled to said second end of said cable, said fastener being configured for removably coupling to the driver's side seatbelt,
a speaker coupled to said housing, said speaker being operationally coupled to said reel, said speaker being selectively couplable to said power module,
wherein said cable is positioned on said reel such that said cable is couplable to the driver's side seatbelt coincident with decoupling said speaker from said power module, and wherein said cable is configured for retracting into said housing upon decoupling of said fastener from the driver's side seatbelt coincident with coupling of said speaker to said power module such that said speaker is compelled to issue an audible warning to a driver that there is an occupied child safety seat in the vehicle; and
wherein said alarm is positioned for coupling to the driver's side seatbelt such that said cable extends around an interior side of said driver's seat opposite a door of said vehicle wherein said alarm is activated and wherein the driver's side seatbelt is positioned in an extended configuration with said driver's side seat belt such that decoupling of said cable from the driver's side seatbelt is required for a driver to exit the vehicle and wherein decoupling of said alarm from the driver's side seatbelt compels said alarm to issue a warning to a driver that there is an occupied child safety seat in the vehicle.

2. The system of claim 1, further including said housing being substantially rectangularly box shaped.

3. The system of claim 1, further including said power module comprising at least one battery, said at least one battery being rechargeable.

4. The system of claim 1, further including said fastener comprising:

a panel, said panel being flexible such that said panel is configured for bending around the driver's side seatbelt;
a hook and loop fastener positioned on a face of said panel; and
wherein said hook and loop fastener is configured for coupling said panel to the driver's side seatbelt.

5. The system of claim 1, further including said speaker being positioned on a side of said housing.

6. The system of claim 1, further comprising:
a plurality of tabs coupled to and extending from a top edge of said housing;
a plurality of penetrations, each said penetration being positioned through a respective said tab; and
wherein said penetrations are positioned through said tabs such that said penetrations are configured for insertion of mounting hardware to couple said housing to the child safety seat.

7. The system of claim 3, further including a first connector coupled to said housing, said first connector being operationally coupled to said at least one battery, wherein said first connector is positioned on said housing such that said first connector is configured for coupling said at least one battery to a power source such that said at least one battery is configured for recharging.

8. The system of claim 7, further comprising:
a pair of second connectors, each said second connector being coupled to a respective opposing end of a cord, said second connectors being complementary to said first connector;
a plug configured for coupling to a cigarette lighter receptacle of the vehicle;
a third connector coupled to said plug, said third connector being complementary to said second connectors; and
wherein a respective said second connector is positioned on said cord such that said respective said second connector is positioned to couple to said first connector to couple said cord to said at least one battery, wherein said third connector is positioned in said plug such that said third connector is positioned to couple to a respective said second connector to couple said cord to said plug.

9. The system of claim 7, further including said first connector comprising a first socket.

10. The system of claim 7, further including a pair of lights coupled to said housing, said lights being operationally coupled to said at least one battery, said lights being configured for displaying a charge level and a charging state of said at least one battery.

11. The system of claim 10, further including said lights being positioned on said front of said housing.

12. The system of claim 10, further including said lights comprising light emitting diodes.

13. A child seat occupancy warning system comprising:
a vehicle having a driver's seat;
an alarm configured for coupling to a child safety seat positioned in a vehicle, said alarm being operationally couplable to a driver's side seatbelt of the vehicle such that said alarm is armed upon coupling to the driver's side seatbelt and activated to issue a warning upon decoupling from the driver's side seatbelt, said alarm comprising:
a housing defining an internal space, said housing being configured for coupling to the child safety seat, said housing being substantially rectangularly box shaped,
a power module coupled to said housing and positioned in said internal space, said power module comprising at least one battery, said at least one battery being rechargeable,
a reel coupled to said housing and positioned in said internal space, said reel being spring-loaded,
a hole positioned in a front of said housing proximate to said reel,
a cable having a first end coupled to said reel, said cable being coiledly positioned around said reel such that said cable is selectively extendable from said reel through said hole, wherein a second end of said cable is positioned external to said housing,
a fastener coupled to said second end of said cable, said fastener being configured for reversibly coupling to the driver's side seatbelt, said fastener comprising:
a panel, said panel being flexible such that said panel is configured for bending around the driver's side seatbelt, and
a hook and loop fastener positioned on a face of said panel such that said hook and loop fastener is configured for coupling said panel to the driver's side seatbelt,
a speaker coupled to said housing, said speaker being operationally coupled to said reel, said speaker being selectively couplable to said power module, said speaker being positioned on a side of said housing, and
wherein said cable is positioned on said reel such that said cable is configured for extending from said housing positioning said fastener for coupling to the driver's side seatbelt coincident with decoupling said speaker from said power module, and wherein said cable is configured for retracting into said housing upon decoupling of said fastener from the driver's side seatbelt coincident with coupling of said speaker to said power module such that said speaker is compelled to issue an audible warning to a driver that there is an occupied child safety seat in the vehicle;
a plurality of tabs coupled to and extending from a top edge of said housing;
a plurality of penetrations, each said penetration being positioned through a respective said tab, wherein said penetrations are positioned through said tabs such that said penetrations are configured for insertion of mounting hardware to couple said housing to the child safety seat;
a first connector coupled to said housing, said first connector being operationally coupled to said at least one battery, wherein said first connector is positioned on said housing such that said first connector is configured for coupling said at least one battery to a power source such that said at least one battery is configured for recharging, said first connector comprising a first socket;
a pair of second connectors, each said second connector being coupled to a respective opposing end of a cord, said second connectors being complementary to said first connector, wherein a respective said second connector is positioned on said cord such that said respective said second connector is positioned to couple to said first connector to couple said cord to said at least one battery;
a plug configured for coupling to a cigarette lighter receptacle of the vehicle;

a third connector coupled to said plug, said third connector being complementary to said second connectors, wherein said third connector is positioned in said plug such that said third connector is positioned to couple to a respective said second connector to couple said cord to said plug;

a pair of lights coupled to said housing, said lights being operationally coupled to said at least one battery, said lights being configured for displaying a charge level and a charging state of said at least one battery, said lights being positioned on said front of said housing, said lights comprising light emitting diodes; and wherein said alarm is positioned for coupling to the driver's side seatbelt such that said cable extends around an interior side of said driver's seat opposite a door of said vehicle wherein said alarm is activated and wherein the driver's side seatbelt is positioned in an extended configuration with said driver's side seat belt such that decoupling of said cable from the driver's side seatbelt is required for a driver to exit the vehicle and wherein decoupling of said alarm from the driver's side seatbelt compels said alarm to issue a warning to a driver that there is an occupied child safety seat in the vehicle.

\* \* \* \* \*